Patented Dec. 16, 1924.

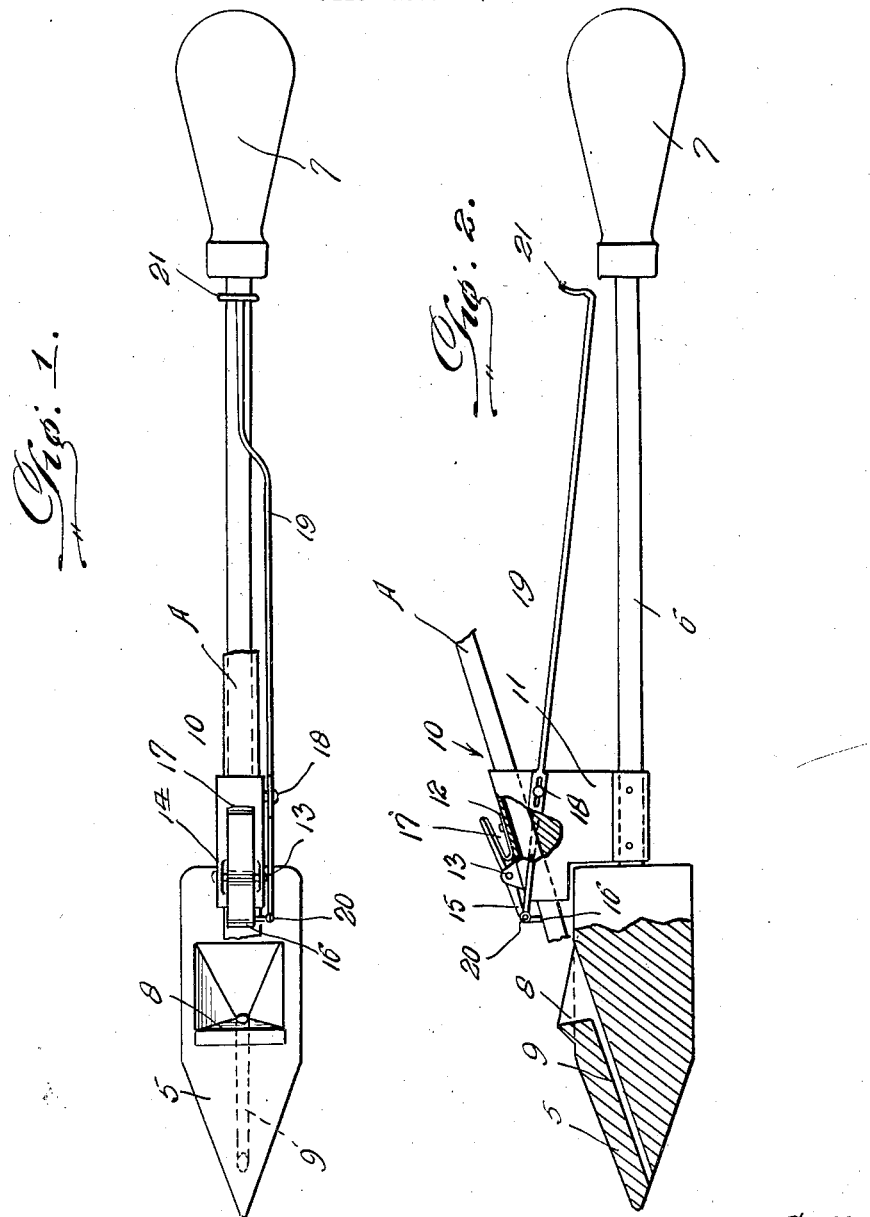

1,519,127

UNITED STATES PATENT OFFICE.

JAMES GAFFNEY, OF JOLIET, ILLINOIS.

SOLDERING IRON.

Application filed November 28, 1923. Serial No. 677,448.

*To all whom it may concern:*

Be it known that I, JAMES GAFFNEY, a citizen of the United States, residing at Joliet, in the county of Will and State of Illinois, have invented certain new and useful Improvements in Soldering Irons, of which the following is a specification.

This invention relates to soldering irons and has more particular reference to a means whereby a stick of solder may be carried by the iron and the same fed to the head thereof for overcoming the usual necessity of holding the sticks of solder within one hand while a tool is being held in the other.

The primary object of the invention resides in the provision of a solder stick holding a feeding means for soldering irons that is extremely simple of construction and one that may be operated efficiently under all conditions.

With the above and other objects in view as the nature of the invention will be better understood, the same comprises the novel form, combination and arrangement of parts hereinafter more fully described, shown in the accompanying drawing and claimed.

In the drawing wherein like reference characters indicate corresponding parts throughout both of the views, and wherein there is set forth the most practical embodiment of the invention with which I am at this time familiar, Figure 1 is a top plan view of a soldering iron constructed in accordance with the present invention, and Figure 3 is a view partly in side elevation and partly in cross section of said tool.

Now having particular reference to the drawing, 5 indicates the usual pointed head of a soldering tool, 6 the elongated rod portion thereof, and 7 the usual handle. Said head 5 is formed upon the top side of its squared portion with a hopper or cup 8, the walls of which are inclined in a direction toward the inlet end of a diagonally extending passageway 9 formed in the head 5 and terminating at its opposite end upon the underside of the pointed portion of said head and this slightly rearwardly of the extreme point thereof as clearly shown in cross section in Figure 2.

Rigidly secured to the rod portion 6 of the soldering tool and this at a point directly rearwardly of the head 5 is a soldering stick carrying means designated generally 10.

Said solder stick holding element comprises a solid block 11 suitably secured at its lower end to said rod portion 6 of the soldering tool and formed at its upper end with an inclined passageway 12, for the reception of a stick of solder A, it being noted that the inclination of said passageway 12 is substantially parallel with the solder conveying passageway 9 in the head 5 of the soldering tool.

Pivotally disposed as at 13 between a pair of spaced ears 14 formed upon the upper inclined end of said solid block 11, and this adjacent the end above the soldering iron head 5, is a solder locking element 15 that is formed at its front end with a pendant finger 16 for engagement with the solder stick A under the influence of a spring 17 which normally maintains said locking element in the position more clearly shown in Figure 2 for thereby preventing any sliding movement of said solder stick within the passageway of the block 11.

Slidably connected to this solid block 11 as at 18 is a relatively elongated rod 19 that is pivotally connected at its front end as at 20 to said locking member 15, the opposite end of this rod being upturned as at 21 for providing a thumb piece whereby said rod may be moved forwardly for consequently disengaging the locking member 15 from the stick of solder A whereby the same will fall by gravity downwardly into the cup or hopper 8 of the head 5 of said soldering iron after which the same will be duly melted by the heat of the head 5 and consequently drip down the passageway 9 onto the work.

It will thus be seen that I have provided a highly novel and efficient form of soldering iron and one that will meet with all of the requirements for a successful commercial use.

Having thus described my invention, what I claim as new and desire to secure by Letters Patent is:—

1. A device of the class described, comprising a soldering iron including a handle and a head, said head being provided with a downwardly inclined passageway opening through the lower side thereof, said passageway being enlarged at its upper end to provide a pocket, and means mounted on the handle at the inner end of said head for holding a stick of solder in an inclined position, said means including a release device to permit the solder to feed by gravity into said pocket as it is melted.

2. A device of the class described, comprising a soldering iron including a handle at the outer end of which is a heat-absorbing head, said head being provided with a forward and downward inclined passage at its outer end through the bottom face of the head, said head being also provided at the upper end of said passage with a pocket for reception of one end of a stick of solder, a holding device for said stick mounted on said handle, said device serving to hold the stick of solder in a downwardly inclined position so that it will feed by force of gravity into said pocket, a spring-pressed holding device for normally maintaining the stick of solder against movement, and a manually-actuated pull-rod slidably mounted on said device and connected with said device for releasing the latter to permit automatic feeding of the solder.

In testimony whereof I affix my signature.

JAMES GAFFNEY.